US008819983B2

(12) United States Patent
Tate

(10) Patent No.: US 8,819,983 B2
(45) Date of Patent: Sep. 2, 2014

(54) SYSTEMS, METHODS, AND APPARATUS FOR SECURING A RECORDING DEVICE TO A HUNTING APPARATUS

(76) Inventor: Jeff Tate, Hardingsburg, KY (US)

(*) Notice: Subject to any disclaimer, the term of this patent is extended or adjusted under 35 U.S.C. 154(b) by 398 days.

(21) Appl. No.: 12/928,757

(22) Filed: Dec. 17, 2010

(65) Prior Publication Data
US 2012/0151815 A1 Jun. 21, 2012

(51) Int. Cl.
F41C 27/00 (2006.01)
(52) U.S. Cl.
CPC ..................................... F41C 27/00 (2013.01)
USPC .................................................. 42/90; 124/88
(58) Field of Classification Search
USPC ................ 42/90; 224/220, 254; 24/2.5, 3.13;
33/266; 248/160, 162.1, 693, 231.85,
248/231.71, 537; 211/85.7; 124/88;
396/419, 428, 426, 421
See application file for complete search history.

(56) References Cited

U.S. PATENT DOCUMENTS

| 2,111,368 | A | * | 3/1938 | Kron | 248/160 |
|---|---|---|---|---|---|
| 2,510,198 | A | * | 6/1950 | Tesmer | 248/229.25 |
| 3,168,274 | A | * | 2/1965 | Street | 248/176.3 |
| 3,757,363 | A | * | 9/1973 | Langlais | 5/503.1 |
| 4,296,725 | A | | 10/1981 | Broderick | |
| 4,452,414 | A | * | 6/1984 | Ansems | 248/278.1 |
| 4,887,193 | A | * | 12/1989 | Dieckmann | 362/89 |
| 5,020,262 | A | | 6/1991 | Pena | |
| 5,347,740 | A | | 9/1994 | Rather et al. | |
| 5,398,176 | A | * | 3/1995 | Ahuja | 362/253 |
| 5,742,859 | A | * | 4/1998 | Acker | 396/419 |
| 5,887,375 | A | | 3/1999 | Watson | |
| 6,032,910 | A | * | 3/2000 | Richter | 248/274.1 |
| 6,286,796 | B1 | * | 9/2001 | Pugliesi | 248/187.1 |
| 6,352,227 | B1 | * | 3/2002 | Hathaway | 248/160 |
| 6,425,697 | B1 | | 7/2002 | Potts et al. | |
| 6,556,245 | B1 | | 4/2003 | Holmberg | |
| 6,705,578 | B2 | | 3/2004 | Mulford et al. | |
| 6,749,166 | B2 | * | 6/2004 | Valentine et al. | 248/309.1 |
| D498,251 | S | * | 11/2004 | Invencio | D16/242 |
| 6,860,668 | B2 | * | 3/2005 | Ibrahim et al. | 403/56 |
| 7,006,144 | B2 | | 2/2006 | Holmberg | |
| 7,255,035 | B2 | | 8/2007 | Mowers | |
| 7,327,394 | B2 | | 2/2008 | Holmberg | |
| 7,604,420 | B2 | | 10/2009 | Moody et al. | |

(Continued)

Primary Examiner — Reginald Tillman, Jr.
(74) Attorney, Agent, or Firm — Valenti Hanley & Robinson PLLC; Kevin T. Duncan

(57) ABSTRACT

The present invention provides a mounting apparatus for attaching to a hunting weapon and supporting a recording device. The apparatus includes means for removably securing a recording device to the apparatus; a connector adapted to removeably attach the apparatus to a hunting weapon; and a flexible, elongate member being semi-rigid and having a first end affixed to the securing means and a second end affixed to the connector, whereby upon attachment of the apparatus to a hunting weapon the flexible, elongate member permits manual repositioning of the secured recording device relative to the hunting weapon while supporting the secured recording device in a set position after manual repositioning occurs. Alternatively, the securing means may include an adjustable means to permit receipt and holding engagement of multiple form factors of recording devices and/or may include a rotating joint such that the securing means and secured recording device may be rotatably repositioned when mounted onto a weapon and/or may further include first and second adjustable brackets for holding the recording device in place. An adapter may form an intermediate connection between the apparatus and a weapon. A stabilizer may balance and offset the weight of the apparatus when mounted to a weapon. The invention may be integrated with other functional components of a weapon, such as a bow stabilizer or scope.

19 Claims, 5 Drawing Sheets

(56) References Cited

U.S. PATENT DOCUMENTS

| | | |
|---|---|---|
| 7,619,676 B2 | 11/2009 | Holmberg |
| 7,789,574 B2 | 9/2010 | Broberg |
| 7,861,985 B2 * | 1/2011 | Galvin .......................... 248/160 |
| 2002/0163588 A1 | 11/2002 | Holmberg |
| 2002/0167606 A1 | 11/2002 | Holmberg |
| 2004/0211868 A1 * | 10/2004 | Holmes et al. ........... 248/231.71 |
| 2009/0060473 A1 * | 3/2009 | Kohte et al. ................... 386/124 |
| 2009/0189039 A1 * | 7/2009 | LaBuda ................... 248/231.81 |
| 2009/0244362 A1 | 10/2009 | Holmberg |
| 2009/0255162 A1 | 10/2009 | Holmberg |
| 2009/0255163 A1 | 10/2009 | Holmberg |
| 2010/0018103 A1 | 1/2010 | Holmberg |
| 2010/0066899 A1 | 3/2010 | Holmberg |
| 2010/0071247 A1 | 3/2010 | Holmberg |
| 2010/0126487 A1 | 5/2010 | Holmberg |
| 2010/0128166 A1 | 5/2010 | Holmberg |
| 2011/0073743 A1 * | 3/2011 | Shamie ........................ 248/537 |
| 2012/0073556 A1 * | 3/2012 | Knowles ........................ 124/88 |
| 2012/0167353 A1 * | 7/2012 | Geller ............................. 24/302 |

* cited by examiner

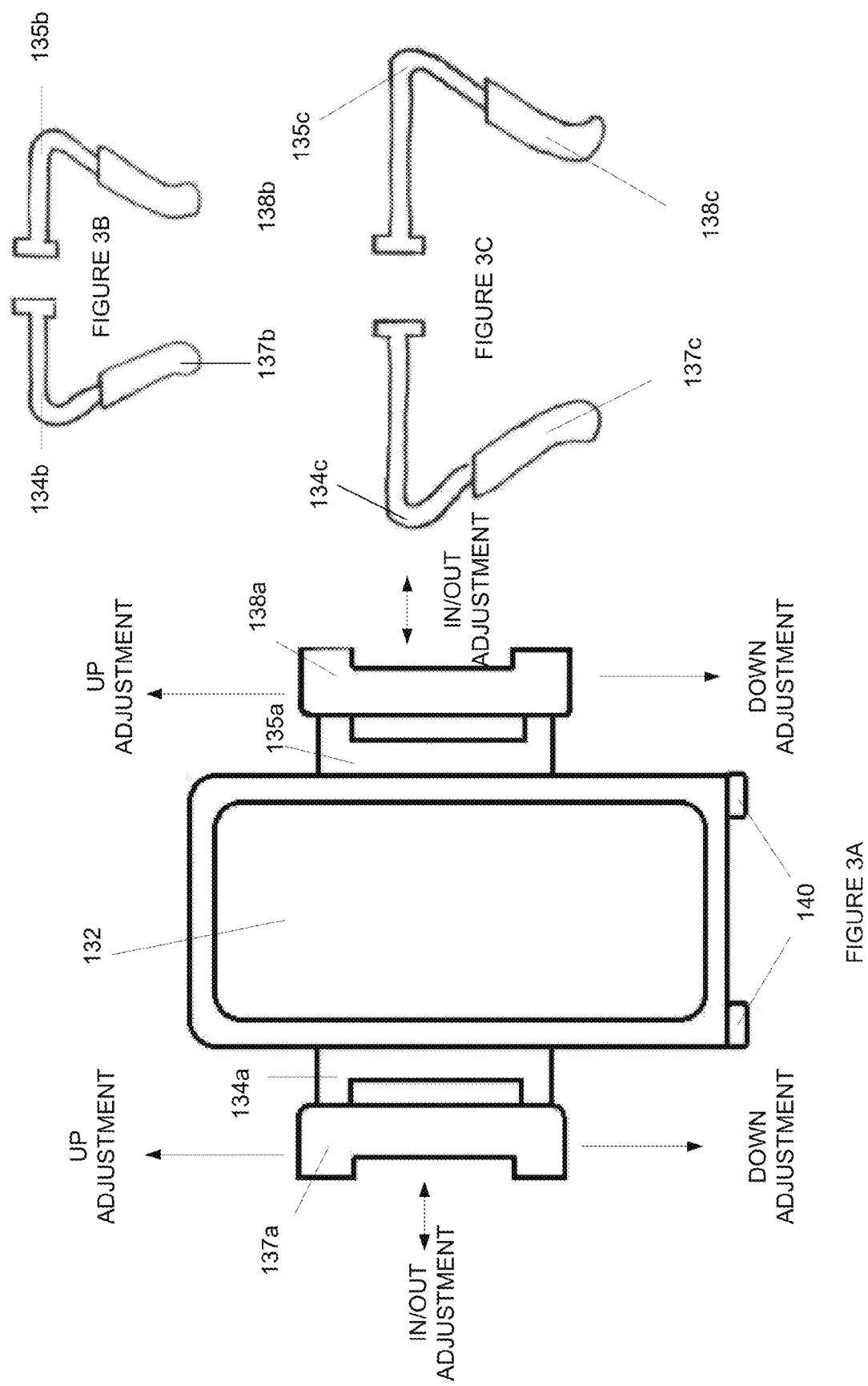

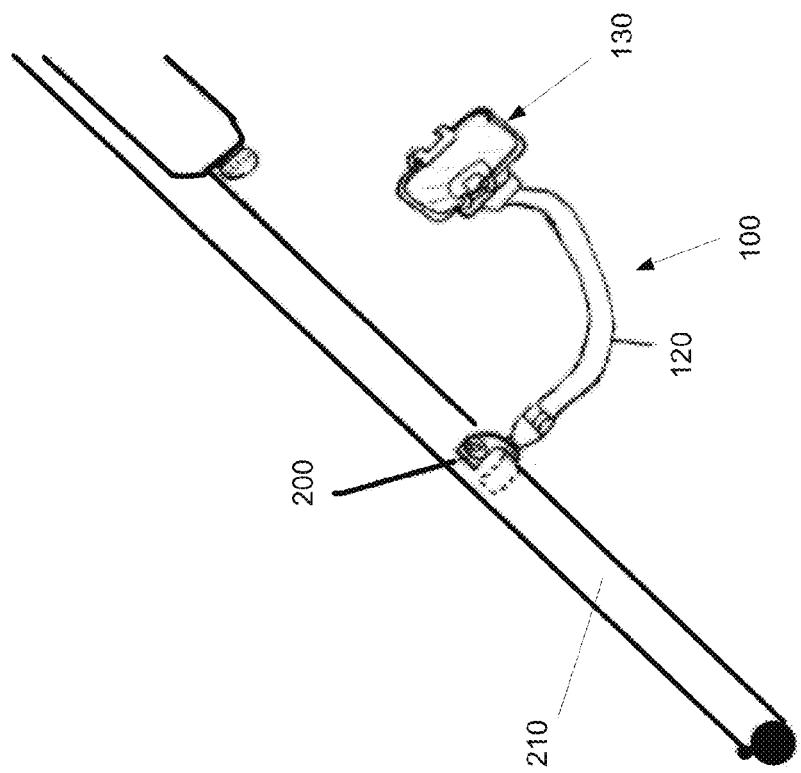
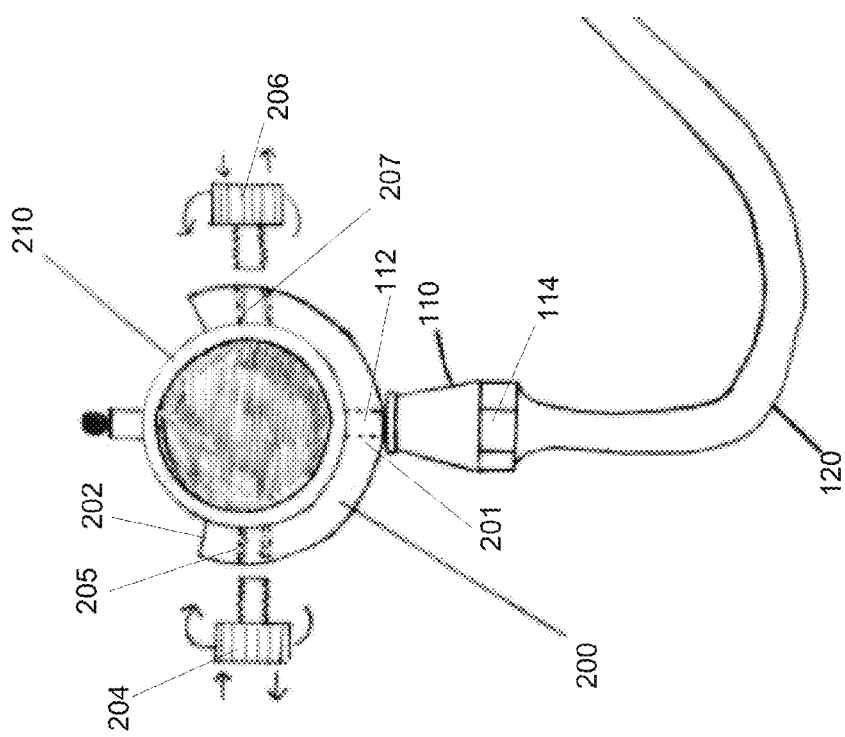

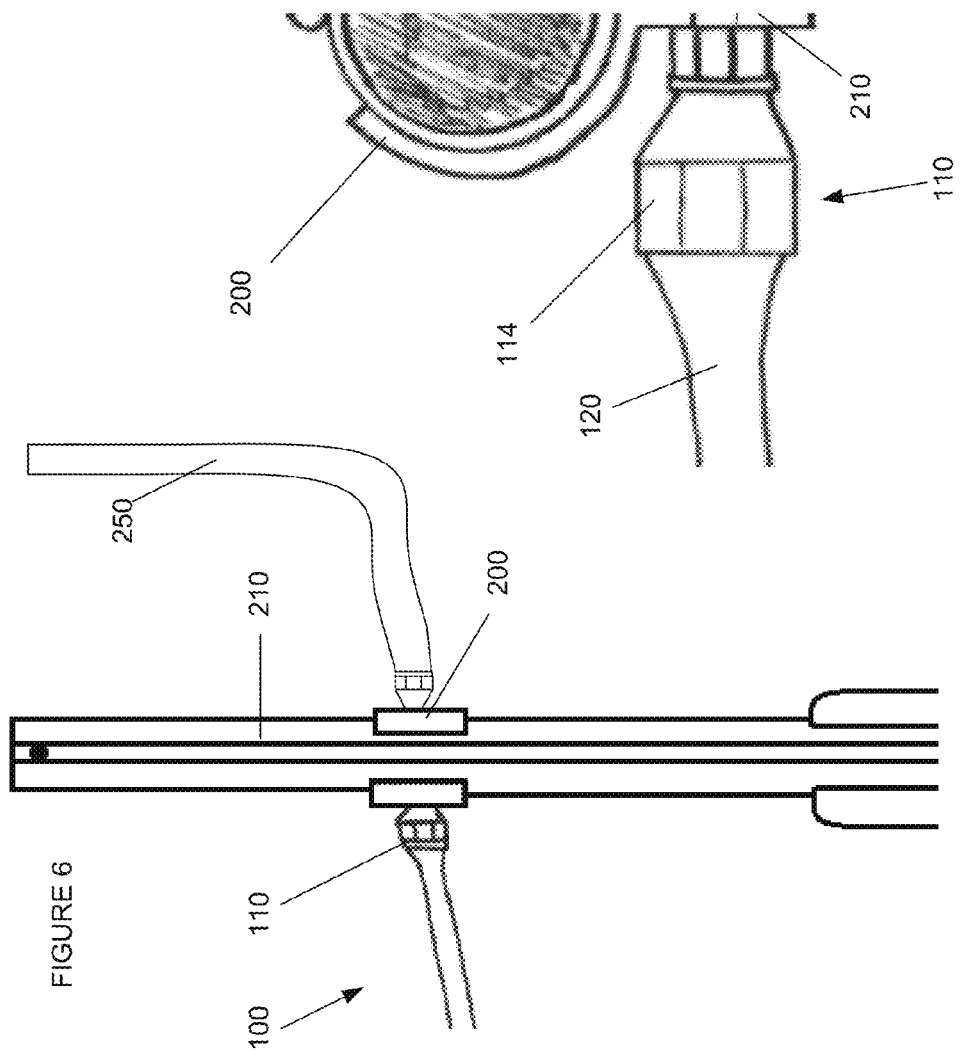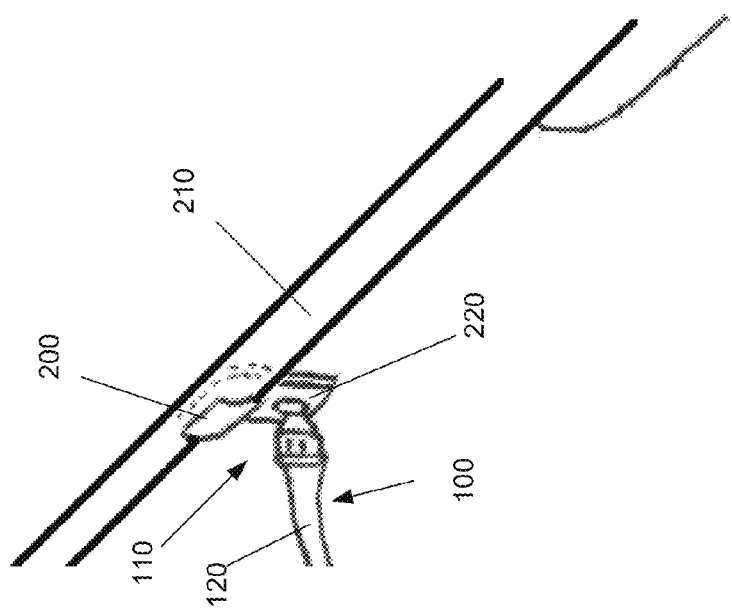

SYSTEMS, METHODS, AND APPARATUS FOR SECURING A RECORDING DEVICE TO A HUNTING APPARATUS

FIELD OF THE INVENTION

The present invention relates generally to an apparatus for securing a video/audio recording device to a hunting device. More particularly, the present invention pertains to a device for attaching a mobile phone with recording capabilities to a hunting bow or gun to allow a hunter to record the hunt and kill.

BACKGROUND OF THE INVENTION

In the hunting industry today, many outdoorsmen are interested in capturing their activities and experiences in video and audio form. For instance, some hunters choose to record their "hunt" and "kill" so that they can later review the video and share the video with friends and fellow hunters. It should be understood that references to "video" recording or capture includes, although not necessarily, audio recording.

Presently, several different ways exist to do this. For example, some hunters ask a second person to accompany them. In doing so, the second person records the hunt and kill using traditional video recording equipment. However, having a second person along complicates the hunt and negatively affects the hunt's success because a second person introduces additional noises, scents, and movements, which may have the undesired effect of causing animals to flee.

Other hunters use a tree or tree-stand mounted device for holding video recording equipment. However, by attaching the video recording equipment to a fixed object like a tree or tree-stand, the hunter's ability to reposition the camera to record the hunt and kill is severely limited.

Still other hunters choose to use a video camera "free hand" to video themselves hunting. This method requires multitasking and involves more movement and is very difficult to do successfully and can be dangerous if not impossible.

Some of the existing prior art references and products in the marketplace provide devices for attaching a traditional video recording device, such as a camcorder or digital camera, to a hunting bow or gun. These devices traditionally mount to a bow using the pre-existing receptacle originally designed for attaching vibration dampening device called a stabilizer or mount to the telescope on a gun.

One problem that arises with current products is that these existing devices are rigid and are attached in a fixed position with limited adjustability relative to the weapon. Even the devices which are adjustable are only minimally adjustable and are only adjustable at a specific joint, usually with some form of locking mechanism. Typically, each joint is only adjustable along one axis. Therefore, the hunter is limited on the adjustments which may be made, and the adjustments usually take more than one step to accomplish. These existing forms of adjustment prevent the hunter from quickly and easily repositioning his video recording device. Moreover, the existing forms of rigid mounting devices have multiple parts and add significant weight and bulk to hunting bows or guns. In addition, such adjustments are further complicated in inclement weather and/or when hunters are wearing loves. Also, adjustments make noise.

Another problem which arises is that these existing devices rely on some form of tape, cassette, SD card, film or memory storing device which the hunter must remove from the recorder and copy, store, or transfer them to another playback device. This prevents the hunter from easily showing the recording to others or electronically transferring the recording without using another device such as a personal computer.

In some embodiments, the present invention utilizes technology known in the art such as ball and socket joint connections for forming a flexible assembly. One well known example of this ball and socket joint connection technology is disclosed in U.S. Pat. No. 5,449,206.

What is needed is a solution to address the various problems associated current devices used to record hunting activities.

SUMMARY OF THE INVENTION

The present invention provides a phone mount for mounting a mobile phone or other small recording device to a hunting device such as a hunting bow or gun. One key benefit to having the recording device attached to the hunting weapon is that in directing the weapon as intended toward the target, the hunter automatically directs the recording device toward the target as well. This is a big advantage to tree or stand mounted devices. In the past, personal recording devices, such as VHR-based video-cameras were simply too large to mount to a hunting weapon such as a bow or gun. The size and weight of the large format recording devices would interfere and diminish the hunter's ability to operate effectively the weapon. With size and weight of recording devices shrinking, it is now possible to mount such devices to weapons without significantly degrading operation of the weapon. The present invention improves still further on the effectiveness and beneficial enjoyment of mounting recording devices to weapons.

The phone mount may be connected to the hunting bow or gun through a standard connecting screw known in the art or through a specially configured adapter. The phone mount has a flexible arm which allows easy adjustment for aiming the camera phone to get the best possible recorded video of the hunt and kill. The phone mount can be used with cameras or other recording devices of varying styles, shapes, and sizes.

In one embodiment the invention provides a mounting apparatus for attaching to a hunting weapon and supporting a recording device. The apparatus includes means for removably securing a recording device to the apparatus; a connector adapted to removeably attach the apparatus to a hunting weapon; and a flexible, elongate member being semi-rigid and having a first end affixed to the securing means and a second end affixed to the connector, whereby upon attachment of the apparatus to a hunting weapon the flexible, elongate member permits manual repositioning of the secured recording device relative to the hunting weapon while supporting the secured recording device in a set position after manual repositioning occurs. In addition, the securing means may include an adjustable means to permit receipt and holding engagement of multiple form factors of recording devices. The securing means may include a rotating joint such that the securing means and secured recording device may be rotatably repositioned when mounted onto a weapon. The securing means may further include first and second adjustable brackets for holding the recording device in place. The apparatus may further comprise an adapter connected to the connector, wherein the adapter is configured to attach to one selected from the group consisting of: a hunting bow, a gun barrel, and a gun scope, the adapter forming an intermediate connection between the apparatus and a weapon. Alt, the apparatus may further comprise a stabilizer adapted to balance and offset the weight of the apparatus when mounted to a weapon. The stabilizer may include a second flexible, elongate member and is adapted to be positioned so as to balance the apparatus when mounted on a weapon. The apparatus may further comprise an adapter to permit mounting of an other device on to the weapon with the apparatus mounted on to the weapon. The flexible, elongate member may include at least one ball and socket joint and a means to permit repositioning of the member and to fix the member in a given position. The securing means may further comprise a means to prevent a recording device from inadvertently displacing relative to the securing means during repositioning of the flexible, elongate member. The invention may be integrated with other functional components of a weapon, such as a bow stabilizer or scope.

In another embodiment the invention provides a system comprising: a hunting device; an apparatus connected to the hunting device, the apparatus comprising: means for removably securing a recording device to the apparatus; a connector adapted to removeably attach the apparatus to the hunting device; and a flexible, elongate member being semi-rigid and having a first end affixed to the securing means and a second end affixed to the connector, whereby upon attachment of the apparatus to the hunting device the flexible, elongate member permits manual repositioning of the secured recording device relative to the hunting weapon while supporting the secured recording device in a set position after manual repositioning occurs.

BRIEF DESCRIPTION OF DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 3 is a diagram depicting the phone holder portion of the phone mount.

FIGS. 4-6 show an adapter configured to connect the phone mount of FIG. 2 to a gun barrel.

FIGS. 7 and 8 show another embodiment of an adapter configured to connect the phone mount of FIG. 2 to a gun barrel.

DETAILED DESCRIPTION OF PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
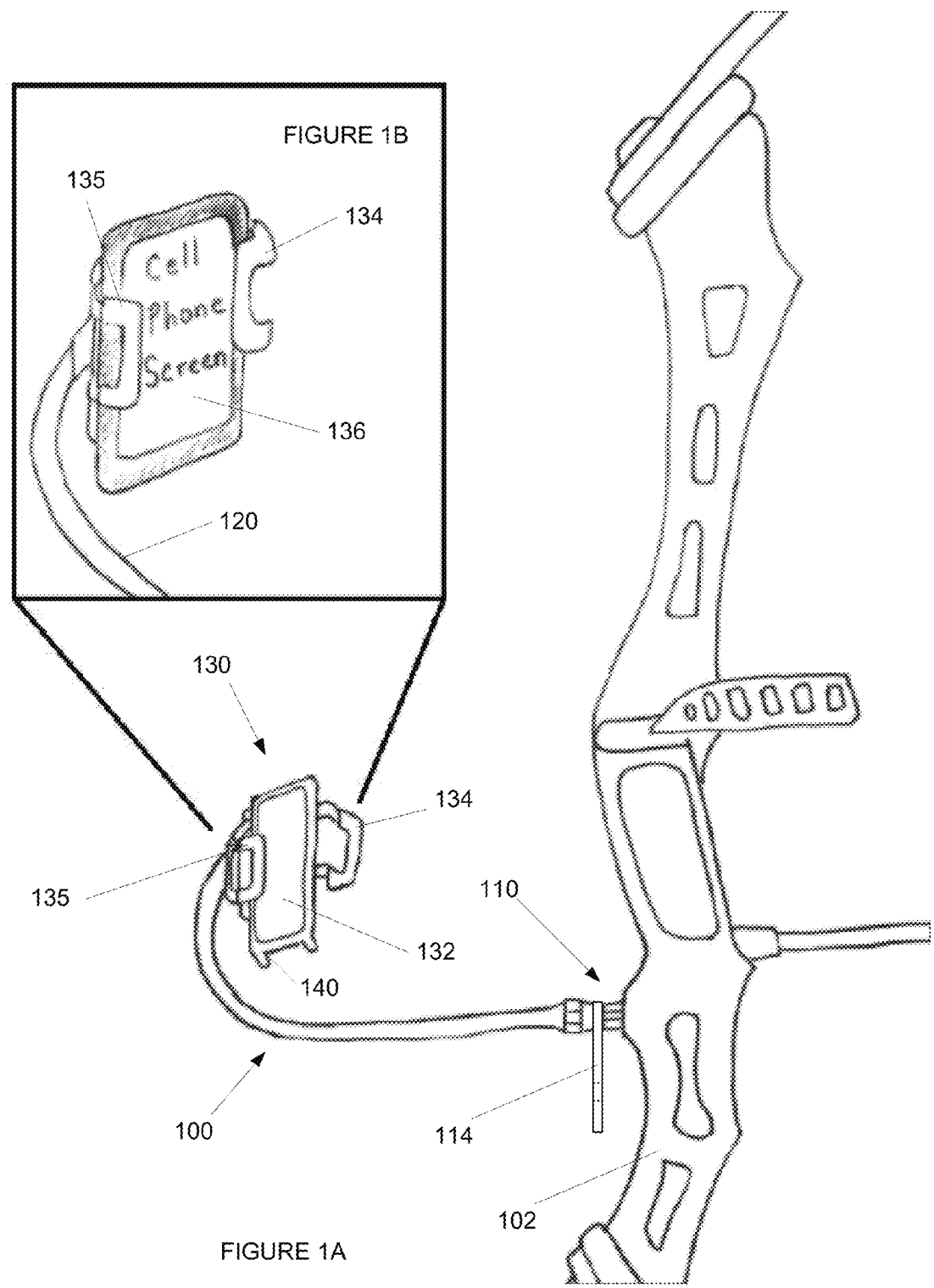
FIG. 1 is a diagram depicting the phone mount attached to a hunting bow.

FIG. 1A is a diagram depicting an exemplary embodiment of phone mount 100 attached to hunting bow 102. Phone mount 100 comprises connector screw 110, flexible arm 120, and camera phone holder 130. Although reference is made herein to a "phone mount" it should be understood that this invention is not limited to phones but applies more broadly to phones with video/audio recording capabilities and other such recording devices. Accordingly, the "phone mount" as used herein is a device for not only supporting "phones" with recording capabilities but other recording devices of size, weight, and form that permits cooperative engagement with the phone mount. Connector screw 110 is of a standard size, allowing connector screw 110 to attach phone mount 100 to a screw hole on various types and models of hunting bows. It is understood that other forms of connections or fasteners are contemplated within the scope of the invention. For instance, in an exemplary embodiment, connector screw 110 comprises a threaded screw (112 shown in FIG. 2) having, for example, a universal 5/16-24 threaded male end. This size is standard to most hunting bows such as hunting bow 102 and is typically used with hunting accessories such as a bow stabilizer. In certain embodiments, phone mount 100 integrates a scope or sighting mechanism (not pictured)which may be attached using an optional secondary device adapter 114 which permits the mounting of another device on the weapon, thereby providing the hunter with the benefit of both phone mount 100 of the present invention and the scope.

In certain embodiments, phone mount 100 may further include a fitting that permits the cooperative attachment of a stabilizer (not pictured). That is, the stabilizer attaches to phone mount 100. In another embodiment, phone mount 100 integrates a stabilizer (not pictured). In these embodiments, the hunter receives the benefit of both phone mount 100 of the present invention and the stabilizer. In yet other embodiments, as discussed below, the connector screw 110 may be configured to attach to an adapter, allowing the phone mount 100 to connect to other types of hunting devices, such as a gun as shown in FIGS. 4-8.

The flexible arm 120 of the phone mount 100 is connected to a hunting device such as hunting bow 102 by screwing the connector screw 110 into an appropriate receiving port on the hunting device configured to receive the connector screw 110. Once attached, the flexible arm 120 may be manipulated by the hunter in order to reposition the camera phone 136 for the best viewing and recording angles and to minimize obstruction associated with phone and mount. In an exemplary embodiment, the flexible arm 120 can be easily adjusted in any of six directions: up, down, left, right, forward, and backwards. The flexible arm 120 may be made out of any rigidly flexible material suitable for supporting the weight of a recording device such as a phone, e.g., an Apple® iPhone®. As used herein, the term rigidly flexible means that the flexible arm 120 can be easy adjusted by applying only minor force, but once the minor force subsides, the flexible arm 120 remains in place, providing a rigid support for the camera phone 136 and camera phone holder 130.

Phone holder 130 is attached to the flexible arm 120 on the end opposite screw connector 110. In an exemplary embodiment, the connection between phone holder 130 and flexible arm 120 is joint 131 which allows phone holder 130 to swivel and/or rotate, preferably, 360 degrees. In another embodiment, phone holder 130 is rigidly affixed to flexible arm 120 at joint 131 and is not separately articulable at joint 131. In an exemplary embodiment, flexible arm 120 uses ball and socket joint technology such as that identified in the background section.

Preferably, phone holder 130 is adjustable so that phone mount 100 can be used with as broad arrange of style and model of mobile phones as possible or desired. For instance, phone holder 130 may be configured to receive and hold a flip or clam style phone. In these embodiments, the "flip" or "clam" style phone (not shown) may extend above or below back plate 132 of the phone holder 130 such that the camera lens has an unobstructed view of the target. In other embodiments, phone holder 130 may be configured to hold phones with a screen on one side and the camera lens on the opposite side, such as an Apple® iPhone® smartphone, Blackberry® smartphone, or Android® smartphone. In these embodiments, phone holder 130 may be adapted to have a hole in back plate 132 which allows the phone 136 to record with an unobstructed view of the target. In another embodiment, camera phone 136 may be held in place in phone holder 130 such that the camera lens extends above or below back plate 132 thereby allowing the phone 132 to record with an unobstructed view of the target.

In an exemplary embodiment as illustrated in FIG. 1B, phone holder 130 has adjustable arms 134 and 135 which secure camera phone 136 in place. Adjustable arms 134 and 135 slide in and out with respect to phone holder 130 thereby allowing phones of varying widths to be secured in phone holder 130. As illustrated in FIG. 1B, phone 136 is secured in place by a user sliding adjustable arms 134 and 135 in against camera phone 136, thereby clamping camera phone 136 securely into phone holder 130. As stated above, phone holder 130 may be used with various models and styles of phones; this is facilitated by the ability to vary the width of adjustable arms 134 and 135. In one embodiment, both adjustable arms 134 and 135 are adjustable by sliding adjustable arms 134 and 135 in and out. In another embodiment, adjustable arms 134 and 135 do not slide in and out but rather are adjustable because they are made from an adjustable or flexible material, allowing adjustable arms 134 and 135 to be manipulated by the user to secure camera phone 136 into phone holder 130. In yet another embodiment, one adjustable arm (such as adjustable arm 134) is fixed in place while the other adjustable arm (such as adjustable arm 135) is adjustable.

Figure 2:
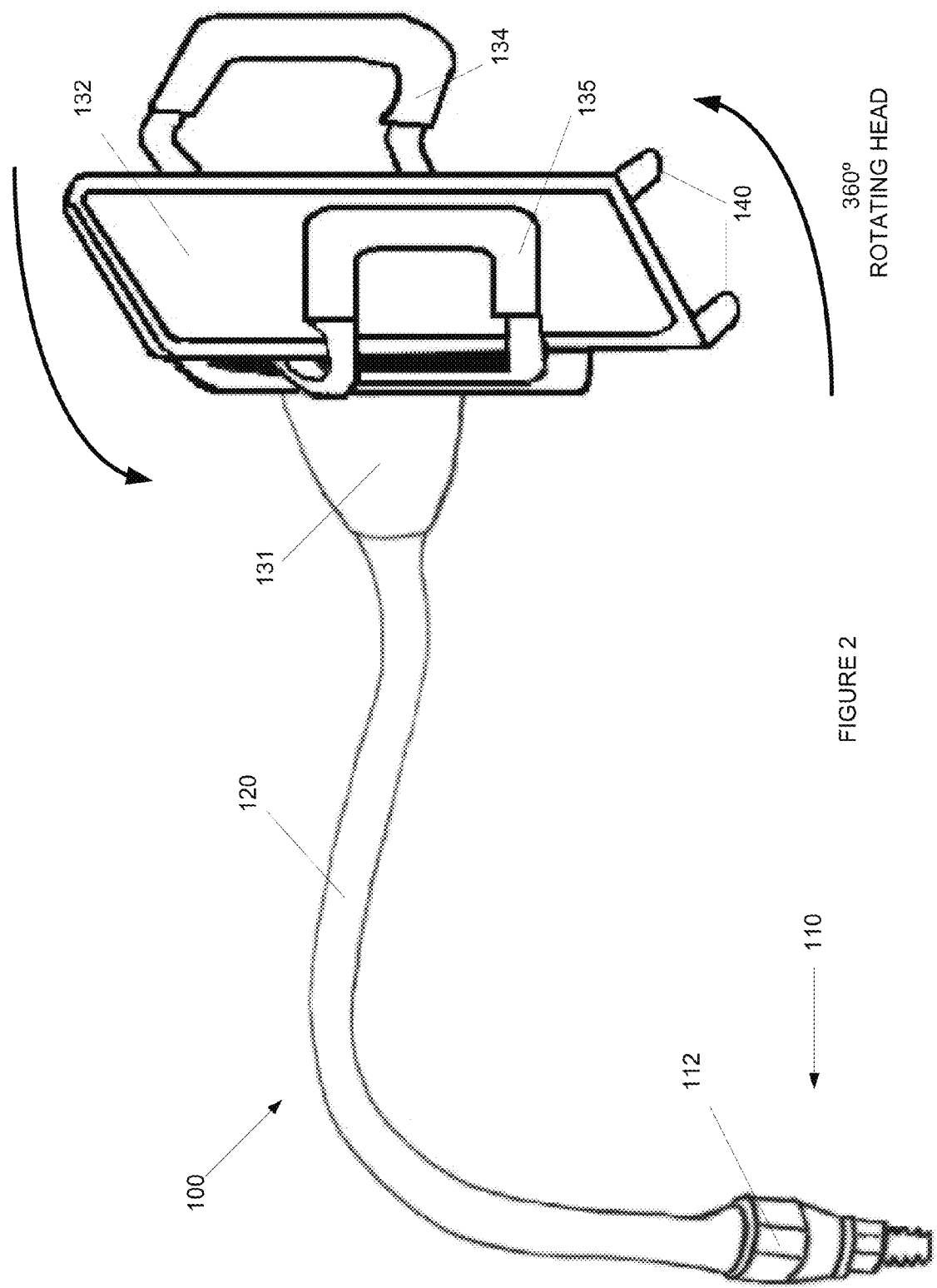
FIG. 2 is a diagram depicting the phone mount.

FIG. 2 depicts an exemplary embodiment of phone mount 100. Phone mount 100 comprises connector screw 110, flexible arm 120, and camera phone holder 130. As shown in FIG. 2, connector screw 110 comprises, for example, threaded screw 112 and tightening nut 114. In an exemplary embodiment, threaded screw 112 may be a universal 5/16-24 threaded male end. This size is standard to most hunting bows such as hunting bow 102 of FIG. 1 and is typically used with hunting accessories such as a bow stabilizer. In other embodiments, as discussed below, the connector screw 110 may be configured to attach to an adapter, allowing the phone mount 100 to connect to other types of hunting devices, such as a gun as shown in FIGS. 4-8. Tightening nut 114 allows a user to tighten threaded screw 112 by turning tightening nut 114 about flexible arm 120. Tightening the tightening nut 114 turns threaded screw 112 so that threaded screw 112 will mate with a receptacle configured to receive threaded screw 112 such as on hunting bow 102 shown in FIG. 1A. Turning the tightening nut 114 to tighten threaded screw 112 allows a user to attach phone holder 100 to a hunting device without turning or rotating the entire phone holder 100. In other embodiments, screw connector 110 may not have tightening nut 114, whereby the user may turn the entire phone holder 100 to tighten threaded screw 112 into a hunting device such as hunting bow 102 shown in FIG. 1A.

As further shown in FIG. 2, connector screw 110 is connected to flexible arm 120. Flexible arm 120 may be manipulated by the hunter in order to reposition the camera phone 136 for the best viewing and recording angles and to minimize obstruction of the hunter's view when operating the weapon. The apparatus allows for ease in repositioning to accommodate either of left or right handed individuals. In an exemplary embodiment, the flexible arm 120 can be adjusted easily in any of six directions: up, down, left, right, forward, and backwards. Flexible arm 120 may be made out of any rigidly flexible material suitable for supporting the weight of a recording device such as a phone, e.g., an Apple® iPhone®. As used herein, the term rigidly flexible means that the flexible arm 120 can be easy adjusted by applying only minor force, but once the miner force subsides, the flexible arm 120 remains in place, providing a rigid support for the camera phone 136 and camera phone holder 130.

As further shown in FIG. 2, in an exemplary embodiment, flexible arm 120 is connected to phone holder 130 at joint 131. Joint 131 allows phone holder 130 to swivel and/or rotate 360 degrees. In another embodiment, phone holder 130 is rigidly affixed to flexible arm 120 at joint 131 and is not separately articulable at joint 131. In addition, protuberances 140 may be provide to help support a mounted phone by allowing the bottom of the phone to rest upon the protuberances 140.

Preferably, phone holder 130 is adjustable so that phone mount 100 can be used with as broad arrange of style and model of mobile phones as possible or desired. For instance, phone holder 130 may be configured to receive and hold a flip or clam style phone. In these embodiments, the "flip" or "clam" style phone (not shown) may extend above or below back plate 132 of the phone holder 130 such that the camera lens has an unobstructed view of the target. In other embodiments, phone holder 130 may be configured to hold phones with a screen on one side and the camera lens on the opposite side, such as an Apple® iPhone® smartphone, Blackberry® smartphone, or Android® smartphone. In these embodiments, phone holder 130 may be adapted to have a hole in back plate 132 which allows the phone 136 to record with an unobstructed view of the target. In another embodiment, camera phone 136 may be held in place in phone holder 130 such that the camera lens extends above or below back plate 132 thereby allowing the phone 132 to record with an unobstructed view of the target.

As shown in FIG. 3A, phone holder 130 allows for phones having a broad range of shape and size to be securely affixed to phone mount 100. For example, phone holder 130 comprises two adjustable arms 134a and 135a, as discussed above, which may be adjusted to hold phones of varying sizes and widths. In one embodiment, adjustable arms 134a and 135a may slide in and out with respect to phone holder 130; in another embodiment, adjustable arms 134a and 135a may be made of an adjustable material allowing adjustable arms 134a and 135a to clamp camera phone 136 into place. In yet another embodiment, adjustable arms 134a and 135a may be adjusted in an up or down direction with respect to phone holder 130, allowing for varying styles and sizes of camera phones to be used with phone mount 100. In one embodiment, adjustable arms 134a and 135a may slide up and/or down.

Further, phone holder 130 may receive varying sizes of adjustable arms 134 and 135. Phone holder 130 may receive a narrow set of adjustable arms 134b and 135b as shown in FIG. 3B or phone holder 130 may receive a wide set of adjustable arms 134c and 135c as shown in FIG. 3C. Again, these variations facilitate the use of camera phones or other recording devices of varying size and shape with phone holder 130. In yet another embodiment, a wide adjustable arm such as 134c may be used in combination with a narrow adjustable arm 135b to work best with a particular phone.

In an exemplary embodiment, adjustable arms 134 and 135 also comprise tips 137 and 138 which prevent the camera phone or other recording device, such as camera phone 136, from moving, slipping, or sliding, once secured by adjustable arms 134 and 135. Tips 137 and 138 may be made of rubber, foam, or some other non-slip material known in the art. Further, tips 137 and 138 provide a cushion between adjustable arms 134 and 135 and camera phone 136. This prevents camera phone 136 from being scratched or damaged by adjustable arms 134 and 135.

FIG. 4 depicts phone mount 100 attached to or including a joint or adapter 200 for attaching the phone mount 100 to another hunting device such as gun barrel 210. Adapter 200 may be used to attach phone mount 100 to various hunting devices such as hunting bows or guns or other devices such as tree stands.

FIG. 5 is a detailed drawing of adapter 200. Adapter 200 attaches to connector screw 110 and allows phone mount 100 to attach to various different devices such as gun barrel 210. As shown in FIG. 5, threaded screw 112 of connector screw 110 fits into threaded screw receptacle 201 and is securely affixed in place by turning tightening nut 114. Once adapter 200 is connected to phone mount 100, adapter 200 can be attached to other hunting devices such as gun barrel 210. In an exemplary embodiment as shown in FIG. 5, adapter 210 is specifically designed for use with a gun barrel such as gun barrel 210. In other embodiments, adapter 200 may be configured to work with other specific devices, such as hand guns, hunting bows, shot guns, double barrel guns, rifles, or other devices.

In the exemplary embodiment of adapter 200 shown in FIG. 5, adapter housing 202 is configured to partially surround gun barrel 210 in such a way as to leave the top line of the gun free from obstruction by the phone movement. This prevents any aiming sight lines from being blocked. Once connected to gun barrel 210, adapter 200 can be secured, for example, by tightening two clamp screws 204 and 205, which turn into clamp screw receptacles 206 and 207. By tightening the two clamp screws, adapter 200 affixes to gun barrel 210. Clamp screws 204 and 205 may be tightened by hand, with a standard screw driver, or with a special tool. Although adapter 200 is shown in FIG. 5 as having two clamp screws 204 and 205, other embodiments of the present invention may have more or less tightening screws. In yet other embodiments, adapter 200 may be secured to gun barrel 210 by other means, such as by magnetic force, by a special clipping mechanism wherein adapter clips into notches on gun barrel 210, or by clamp housing 202 completely surrounding gun barrel 210. In still yet another embodiment, threaded screw 112 may also act as a clamp screw, allowing another clamping point on clamp housing 202. In addition, an approximately equal but opposite weight arm (not shown) may be included with the phone mount to help offset imbalance caused by phone mount 100. It too would be preferably flexibly adjustable.

FIG. 6 is another illustration of adapter 200 connected to gun barrel 210. As shown, connector screw 110 of phone mount 110 connects to adapter 200. Also depicted is stabilizer 250, which may either be a fixed, rigid object or a second, flexible member. In a rigid embodiment, stabilizer 250 is fixed to the adapter 200 to counterbalance the weight of the phone mount 100. In flexible member configuration, stabilizer 250 may be adjusted or reconfigured to provide for more precise weapon stabilization. The stabilizer 250 may be attached to adapter 200 in place of a clamp screw in either of the clamp screw receptacles 205 or 207. The stabilizer 250 may also be mounted to a secondary device adapter such as secondary device adapter 114 as seen in FIG. 1A to allow the stabilizer to be used in conjunction with the phone mount 100 when used on hunting bow 102.

FIG. 7 shows another embodiment of adapter 200. Adapter 200 shown in FIG. 7 has an extension block 220 which allows phone mount 100 to be connected to adapter 200 by connector screw 110 to extension block 220.

FIG. 8 is an alternate view of FIG. 7, which shows another embodiment of adapter 200. In this figure, phone mount 100 connects to extension block 220 of adapter 200. In particular, connector screw 110 connects to extension block 220 by threaded screw 112 (not shown in FIG. 8) connecting to threaded screw receptacle 201 (not shown in FIG. 8).

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A mounting apparatus for attaching to a hunting weapon and supporting a recording device, the apparatus comprising:
   means for removably securing a recording device to the apparatus;
   a connector adapted to fixedly and removeably join the apparatus to a hunting weapon;
   a flexible, elongate member being semi-rigid and having a first end affixed to the means for removably securing and a second end affixed to the connector, whereby upon attachment of the apparatus to a hunting weapon the flexible, elongate member permits manual repositioning of the secured recording device relative to the hunting weapon while supporting the secured recording device in a set position after manual repositioning occurs; and
   a stabilizer adapted to balance and offset the weight of the apparatus when mounted to a weapon, the stabilizer comprising: a second flexible, elongate member adapted to be positioned so as to balance the apparatus when mounted on a weapon.

2. The apparatus of claim 1, wherein the means for removably securing includes an adjustable means to permit receipt and holding engagement of multiple form factors of recording devices.

3. The apparatus of claim 1, wherein the means for removably securing includes a rotating joint such that the securing means and secured recording device may be rotatably repositioned when mounted onto a weapon.

4. The apparatus of claim 1, wherein the means for removably securing further comprises first and second adjustable brackets for holding the recording device in place.

5. The apparatus of claim 1, further comprising an adapter connected to the connector, wherein the adapter is configured to attach to one selected from the group consisting of: a hunting bow, a gun barrel, and a gun scope, the adapter forming an intermediate connection between the apparatus and a weapon.

6. A system comprising:
   a hunting device;
   an apparatus connected to the hunting device, the apparatus comprising:
   means for removably securing a recording device to the apparatus comprising first and second adjustable brackets for holding the recording device in place;

a connector adapted to fixedly and removeably join the apparatus to the hunting device; and a flexible, elongate member being semi-rigid and having a first end affixed to the means for removably securing and a second end affixed to the connector, whereby upon attachment of the apparatus to the hunting device the flexible, elongate member permits manual repositioning of the secured recording device relative to the hunting weapon while supporting the secured recording device in a set position after manual repositioning occurs.

7. The system of claim 6, wherein the means for removably securing includes an adjustable means to permit receipt and holding engagement of multiple form factors of recording devices.

8. The system of claim 6, wherein the means for removably securing includes a rotating joint such that the securing means and secured recording device may be rotatably repositioned when mounted onto the hunting device.

9. The system of claim 6, further comprising an adapter connected to the connector, wherein the adapter is configured to attach to one selected from the group consisting of: a hunting bow, a gun barrel, and a gun scope, the adapter forming an intermediate connection between the apparatus and the hunting device.

10. The system of claim 6, further comprising a stabilizer adapted to balance and offset the weight of the apparatus when mounted to the hunting device.

11. The system of claim 10, wherein the stabilizer includes a second flexible, elongate member and is adapted to be positioned so as to balance the apparatus when mounted on the hunting device.

12. The apparatus of claim 1, wherein the connector further comprises a threaded male or female end adapted to be fixedly and removeably joined to an other male or female connector.

13. The system of claim 6, wherein the connector further comprises a threaded male or female end adapted to be fixedly and removeably joined to an other male or female connector.

14. A system comprising:
a hunting device;
an apparatus connected to the hunting device, the apparatus comprising:
means for removably securing a recording device to the apparatus;
a connector adapted to fixedly and removeably join the apparatus to the hunting device;
an adapter connected to the connector, wherein the adapter is configured to attach to one selected from the group consisting of: a hunting bow, a gun barrel, and a gun scope, the adapter forming an intermediate connection between the apparatus and the hunting device; and
a flexible, elongate member being semi-rigid and having a first end affixed to the means for removably securing and a second end affixed to the connector, whereby upon attachment of the apparatus to the hunting device the flexible, elongate member permits manual repositioning of the secured recording device relative to the hunting weapon while supporting the secured recording device in a set position after manual repositioning occurs.

15. The system of claim 14, wherein the means for removably securing includes an adjustable means to permit receipt and holding engagement of multiple form factors of recording devices.

16. The system of claim 14, wherein the means for removably securing includes a rotating joint such that the securing means and secured recording device may be rotatably repositioned when mounted onto the hunting device.

17. The system of claim 14, wherein the means for removably securing further comprises first and second adjustable brackets for holding the recording device in place.

18. The system of claim 14, further comprising a stabilizer adapted to balance and offset the weight of the apparatus when mounted to the hunting device.

19. The system of claim 18, wherein the stabilizer includes a second flexible, elongate member and is adapted to be positioned so as to balance the apparatus when mounted on the hunting device.

* * * * *